(12) United States Patent
Heiney et al.

(10) Patent No.: US 8,382,001 B2
(45) Date of Patent: Feb. 26, 2013

(54) APPARATUS AND METHOD FOR REPELLING AN UNDESIRED SPECIES FROM A SUBJECT SPECIES

(75) Inventors: Kathryn M. Heiney, Wimberley, TX (US); Desire DuBounet, Budapest (HU); Melissa M. Rogers, Austin, TX (US)

(73) Assignee: R&T Enterprises, LLC, Springfield, OR (US)

( * ) Notice: Subject to any disclaimer, the term of this patent is extended or adjusted under 35 U.S.C. 154(b) by 225 days.

(21) Appl. No.: 12/705,557

(22) Filed: Feb. 12, 2010

(65) Prior Publication Data
US 2010/0243745 A1  Sep. 30, 2010

Related U.S. Application Data

(60) Provisional application No. 61/152,210, filed on Feb. 12, 2009.

(51) Int. Cl.
*G06K 19/06* (2006.01)

(52) U.S. Cl. ........................ 235/493; 235/492

(58) Field of Classification Search .................. 235/493, 235/492, 487
See application file for complete search history.

(56) References Cited

U.S. PATENT DOCUMENTS

2007/0017975 A1 * 1/2007 Lewis et al. .................. 235/380

* cited by examiner

*Primary Examiner* — Karl D Frech

(57) ABSTRACT

A pest management apparatus includes a machine readable storage medium such as a magnetic strip. The machine readable storage medium embeds trivector data indicative of a composite trivector signature. The composite trivector signature is derived from first and second trivector signatures. The first and second trivector signatures are indicative of first and second electromagnetic fields characteristic of first and second species respectively. The composite trivector signature may be derived by summing the first trivector signature and an inverse of the second trivector signature. The machine readable storage medium may have a plurality of tracks and one or more of the tracks may include a portion of the trivector data. The magnetic strip may include three tracks, each storing a component of the trivector data. The presence of each data component within its respective track generates a magnetic field and the cumulative effect of the three fields approximates the composite trivector field.

8 Claims, 4 Drawing Sheets

APPARATUS AND METHOD FOR REPELLING AN UNDESIRED SPECIES FROM A SUBJECT SPECIES

This application claims the priority benefit, under 35 USC 119(e), of U.S. Provisional Patent Application No. 61/152,210, filed Feb. 12, 2009, which is incorporated by reference herein in its entirety.

BACKGROUND

1. Field of the Disclosure

The disclosed subject matter relates generally to a method and apparatus for repelling an undesired species, such as an insect, from a subject species such as livestock, humans, domestic pets, and so forth.

2. Description of the Related Art

Various techniques, or electrochemical sensing methodologies, have been developed to measure and "map" electromagnetic fields in the study of chemical, biological, environmental and industrial applications. Electrochemical sensing methodologies are used in a wide range of applications, from understanding the physics of electron transfer (ET) to process monitoring. From a plethora of electrochemical techniques, voltammetry, where the electrode voltage is excited in a pre-determined manner, has been heavily applied for various chemical, biological, environmental and industrial measurements.

For instance, cyclic voltammetry, where the voltage excitation is a ramp, has provided new insights in phenomena as diverse as neurotransmitter dynamics, protein ET or fuel cell technology. Recently, more complicated voltage inputs such as alternating current (AC) voltammetry have been applied in order to probe the electrochemical system under investigation on different timescales, explore the kinetics and thermodynamics of different processes, or selectively target specific process dynamics, such as parallel reactions, leading to comparisons with NMR or impedance spectroscopy but with the advantage of including in vivo applications.

Subatomic particles including protons and electrons influence the electromagnetic characteristics of a substance in which the particles occur. As an example, protons and neutrons affect the manner in which a substance accepts and donates electrons. Carbon, for instance, has very stable electrons in the outer shell and is therefore a good insulator with respect to electrical currents. On the other hand, many metals have loosely coupled electrons in the other shell that make these materials good conductors. How substances react to each other may be influenced by the "shapes" of their respective voltammetrically determined i-t-E surfaces. See, e.g., Voltammetry Retrospective, *Analytical Chemistry*, Volume 72, No. 9 pp. 346A-352A (2000).

BRIEF DESCRIPTION OF THE DRAWINGS

A better understanding of the claimed subject matter can be obtained when the following detailed description of the disclosed embodiments is considered in conjunction with the following figures, in which:

DESCRIPTION OF THE EMBODIMENT(S)

Figure 1:
FIG. 1 is a front view of an exemplary embodiment of a pest management apparatus.

Disclosed are an apparatus, media, and method for the management and prevention of infestation by an insect or other pathogen species of a subject species such as livestock, humans, and pets. Throughout the remainder of this document, the term "pathogen" will be used to refer collectively to any pest or any biological agent that may cause disease or discomfort to its host or to another species. The disclosed apparatus and method leverage technology that measures electromagnetic fields associated with living organisms using microelectrodes and various time-dependent voltammetric techniques to produce a three-dimensional topological map, or a "trivector," corresponding to each organism including pathogen species and subject species. A three-dimensional trivector "signature," which is numerical representation based upon fractal mathematics, of each trivector is generated. The trivector signature of the subject species may then be combined with an inverse of the trivector signature of the pest or pathogen to produce a composite trivector signature. In some embodiments, data corresponding to the composite trivector signature may then be imprinted on the tracks of a magnetic strip or other form of computer readable. The apparatus may then be placed in proximity, typically on a collar, of the particular subject species, such as, but not limited to, a human or a domestic pet. In one embodiment where the machine readable storage medium is a magnetic strip, the magnetic strip may include three tracks, each capable of storing a portion of the composite trivector signature data. In this embodiment, each of the encoded tracks may generate a magnetic field and the three tracks together may generate a composite magnetic field that emulates or approximates the field associated with the composite trivector.

Relying on the fact that even a weak electromagnetic field can affect chemical reactions and that various organism may be either attracted or repelled by a field associated with the appropriately designed composite trivector signature, each particular signature is designed specifically to influence the subject species' own field to repel the pathogen species represented in the composite trivector signature. In this manner, the appropriately designed trivector, stimulates the biology of the subject species, thus enabling the subject species to develop a defense for the corresponding pest or pathogen species. In other words, the apparatus functions as a deterrent to or repellent of insect infestation.

In one aspect, a disclosed method determines a trivector corresponding to a particular subject species; generates a second trivector corresponding to a specific type of pest or pathogen species; generates trivector signatures, e.g., based upon fractal mathematics, for each of the first and second trivectors; manipulates the two trivector signatures, e.g., inverts the second trivector signature to produce an inverted trivector signature and generates a composite trivector signature corresponding to the first trivector signature and the inverted trivector signature; and imprints a representation of the composite trivector signature onto tracks of a magnetic strip affixed to a substrate. The substrate is then placed in proximity to the corresponding animal by, for example, attaching the apparatus to a collar. In the case of a subject human, the apparatus may be, but is not limited to, attached to a necklace or watch band or incorporated into an article of clothing.

In another aspect, a disclosed pest management apparatus includes a tangible, machine readable storage medium, affixed to substrate. Trivector data is embedded in the machine readable storage medium. The trivector data may be indicative of a composite trivector signature where the composite trivector signature is derived from a first trivector signature and a second trivector signature. The first trivector signature may be indicative of an electromagnetic field associated with or characteristic of a first species such as a mammal or other animal while the second trivector signature may be indicative of an electromagnetic field associated with or characteristic of a second species such as an insect, or other form of pest or pathogen. In some embodiments, the composite trivector signature may be derived by summing the first trivector signature and an inverse of the second trivector signature.

The machine readable storage medium may be implemented as a magnetic strip. The magnetic strip may include a plurality of tracks and each of the tracks may embed a portion of the trivector data. In one embodiment, the magnetic strip includes three tracks, all of which may store portions of the trivector data. The composite trivector signature may represent or indicate three vectors and the portion of the trivector data stored on each of the three tracks may produce a magnetic field approximating a respective one of the three vectors. In some of the three track embodiments, the first track may include alphabetic characters, e.g., "horse mosquito" to enable a conventional card reader to identify the subject species and pathogen species that the apparatus is intended for. Differentiation with respect to conventional financial cards may be achieved by using non standard start sentinels on the first, second, and/or third tracks. In these embodiments, a conventional card reader may not be able to identify the trivector data stored on the card.

In another aspect, a disclosed method of repelling a second species with respect includes determining a first trivector signature for the first species and a second trivector signature for the second species wherein the first trivector signature is derived from a representation of an electromagnetic field characteristic of the first species and the second trivector signature is derived from a representation of an electromagnetic field characteristic of the second species. A composite trivector signature is then generated from the first trivector signature and the second trivector signature. Trivector data, derived from the composite trivector signature, is then stored on a magnetic strip of a pest management tag. Generating the composite trivector signature may include adding the first trivector signature to an inverse of the second trivector signature. The magnetic strips may include a plurality of tracks and storing the trivector data may include storing a portion of the trivector data on each of the plurality of tracks. The number of tracks may, in some embodiments, be equal to three or more.

Storing the trivector data on the pest management tags may include storing a first start sentinel on said first track and a second start sentinel on said second track, wherein said first start sentinel represents an ASCII character other than "%" and wherein said second start sentinel represents an ASCII character other than ";" Determining the first and second trivector signature may be achieved by retrieving predetermined trivectors signatures from a table of trivector signatures or by performing voltammetric measurements on the first and second species and deriving the first and second trivector signatures from the voltammetric measurements. The pest management tag may then be removeably affixed to the first species.

In another aspect, a magnetic strip of other form of tangible, machine readable storage medium embeds composite trivector signature data. The machine readable storage medium may include three or more tracks. A first data component of the composite trivector signature data may be embedded in or otherwise stored on a first track, a second data component of the trivector data may be embedded in or otherwise stored on a second track, and a third data component of the trivector data may be embedded in or otherwise stored on a third track. The composite trivector signature data is derived from a first trivector signature and a second trivector signature, wherein the first trivector signature is representative of an electromagnetic field characteristic of a first species and the second trivector signature is representative of an electromagnetic field characteristic of a second species.

A first magnetic field generated by the first data portion embedded in the first track, a second magnetic field generated a first magnetic field, and a third magnetic field generated by the third data portion may produce a cumulative magnetic field, in proximity to the machine readable storage medium, wherein the cumulative magnetic field approximates a field corresponding to the composite trivector signature. In some embodiments, the magnetic strip or other form of tangible, machine readable medium is affixed to a substrate. The substrate material may be any of various materials including flexible, rigid, or substantially rigid plastic, semiconductor, and dielectric.

Other devices, methods, functionality, features and advantages of the claimed subject matter will be or will become apparent to one with skill in the art upon examination of the following figures and detailed description. For example, although described with particular reference to a pet repellent and a small plastic tag, the claimed subject matter can be implemented in any device in which pest repellant is desirable.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the figures, FIG. 1 is a front view of an exemplary embodiment of a pest management apparatus 100. A hole 102 in pest management apparatus 100 enables a cord or other attachment means to be strung through pest management apparatus 100, thereby enabling pest management apparatus 100 to be attached to a collar, harness or other device affixed to a subject species such as livestock, humans, and domestic pets. Marking 104 indicates the subject species for which pest management apparatus 100 is designed to be removeably affixed. Marking 106 indicates a pathogen species that pest management apparatus 100 enables the subject species to repel. A logo 108 displays a brand name of pest management apparatus 100.

Figure 2:
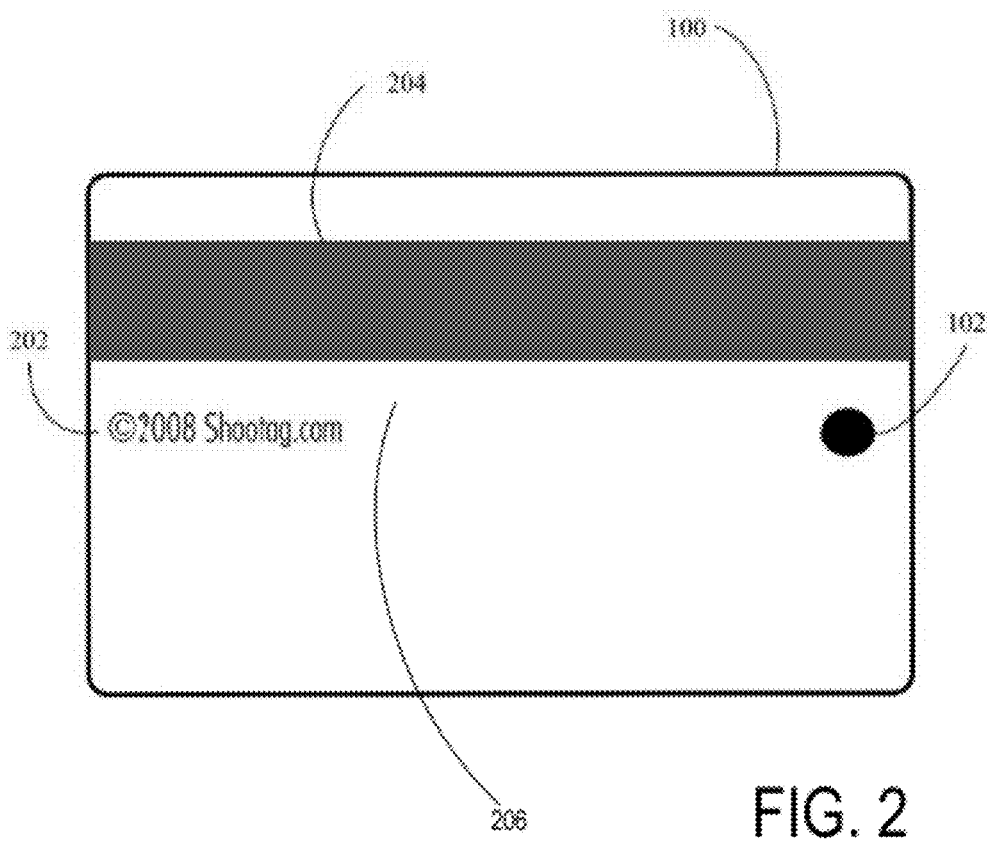
FIG. 2 is a rear view of an exemplary embodiment of the pest management apparatus of FIG. 1.

FIG. 2 is a back view of pest management apparatus 100 in which pest management apparatus 100 has been flipped and rotated ninety degrees (90°) with respect to the view of FIG. 1. As in FIG. 1, hole 102 is visible in FIG. 2. A copyright notice 202 is printed directly below a machine readable storage medium 204. Machine readable storage medium 204 is affixed to a substrate 206 that provides mechanical support. In the embodiment depicted in FIG. 2, substrate 206 may be flexible, semi-rigid, substantially rigid, or rigid plastic substrate such as the plastic that might support the magnetic strip on the back of a credit card, debit card, or automatic teller machine (ATM) card. In other embodiments, the machine readable storage medium 204 may be affixed to a semiconductor substrate, a printed circuit board, a dielectric material substrate, or another material depending upon the implementation. Machine readable storage medium 204, might be affixed to a substrate 206 within a user's mobile telephone or smart phone. Although not apparent in FIG. 2, machine readable storage medium 204 may be a magnetic strip comprised of three separate tracks, making it suitable to enable the embedding of data capable of generating a three-dimensional holographic image. Magnetic strips and other forms of machine readable storage medium such as machine readable storage medium 204 and methods for embedding information therein should be familiar to those with skill in the art associated with credit and debit cards.

Some embodiments of the disclosed subject matter are implemented as method or processes for performing a set or sequence of steps. Some other embodiments may be implemented using software, i.e., a set of machine executable instructions stored on an machine readable storage medium that, when executed, cause the executing machine, e.g., a computer, to perform the steps. The functionality underlying both of these embodiments may be illustrated using a flow diagram.

Figure 3:
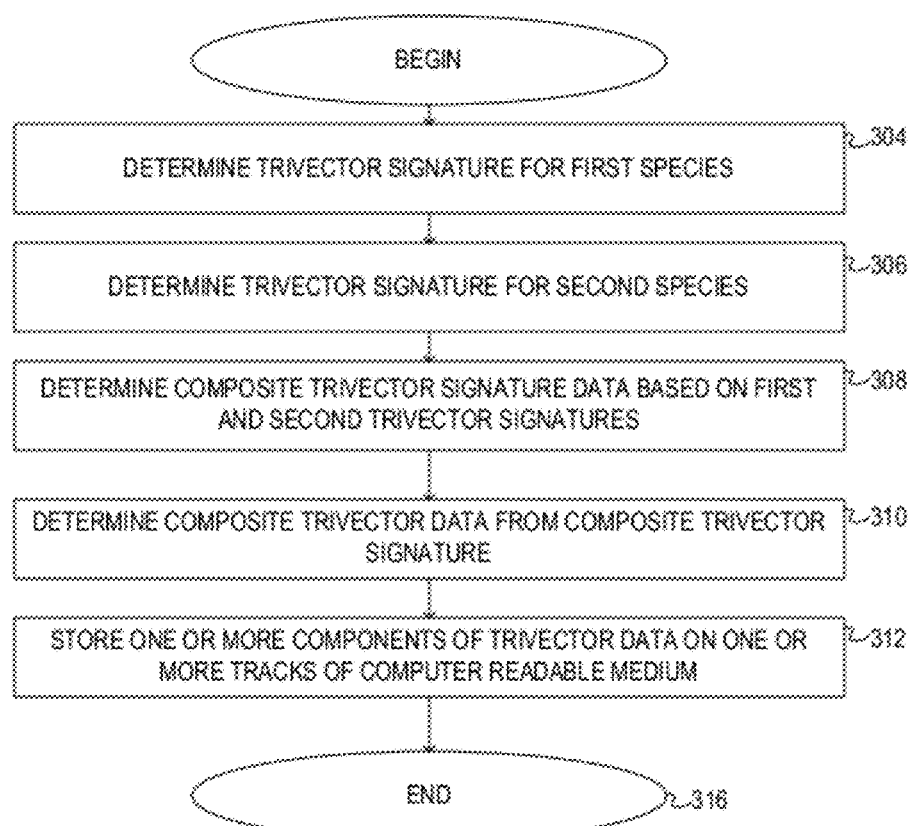
FIG. 3 is a flow diagram depicting selected elements of an embodiment of a pest management method.

FIG. 3 is a flow diagram depicting selected elements of an embodiment of a method 300 for producing a pest management apparatus. As depicted in FIG. 3, method 300 determines (block 304) a trivector signature for a the subject species. The trivector signature for a subject species may be determined by taking voltammetric measurements of the subject species or a sample of the subject species to generate a voltammetric surface associated with the species and then performing fractal math operations or other operations to derive a trivector signature from the voltammetric surface. Other embodiments may leverage preexisting work in which the trivector signatures of many common species have been determined from voltammetric measurements or other techniques, stored in an accessible database, and made available to an appropriately configured software application executing on a computing device. Similarly, method 300 as shown includes block 306 in which a trivector signature for a second species, the pathogen species, is determined. Again, the determination of a trivector signature for the second species may be done by voltammetric measuring techniques or by accessing an appropriate trivector signature database.

Method 300 as depicted further includes determining (block 308) a composite trivector signature data based on first and second trivector signatures. In some embodiments, the composite trivector signature is determined by adding the trivector signature corresponding to the first species and the inverse of the trivector signature for the second species. Other embodiments, however, may use variations of this trivector signature manipulation to determine the composite trivector signature. Method 300 as shown further depicts block 310 in which composite trivector data is determined from the composite trivector signature. The composite trivector signature may or may not be in a form or format suitable for storing directly on a machine readable storage medium. In cases where the composite trivector signature is not suitable for storing on the machine readable storage medium, composite trivector data, suitable for storing on the machine readable storage medium to generate the desired field in proximity to the machine readable storage medium is determined. Method 300 as depicted further depicts block 312 in which the composite trivector data is stored on one or more tracks of the machine readable storage medium. As suggested previously, one such implementation employs three tracks of a magnetic strip embodiment of the machine readable storage medium and the composite trivector data has three components. When each of the components is stored on a respective track of the machine readable storage medium, each track contributes a magnetic field component that produces a cumulative magnetic field that emulates or approximates the composite trivector signature.

Figure 4:
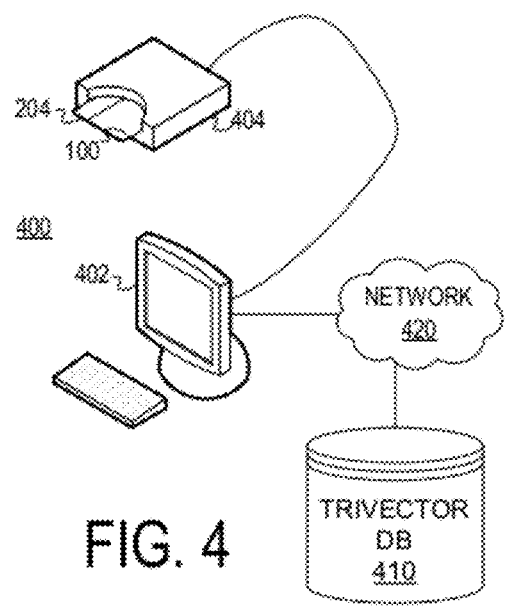
FIG. 4 depicts selected elements of an embodiment of a system for generating apparatus.

Referring now to FIG. 4, selected elements of an embodiment of a system 400 suitable for producing a pest management apparatus as describe herein are depicted. In the depicted embodiment, system 400 includes a desktop, laptop, server, or other form of computer 402 coupled, wirelessly or otherwise, to an peripheral device 404 and to a trivector signature database 410 via a network 420. Peripheral device 404 represents any machine or apparatus capable of receiving information from computer 402 and writing, storing, or otherwise encoding the received information onto a machine readable storage medium 204 of a pest management apparatus 100. In the depicted embodiment, computer 400 may retrieve trivector signature information for various species from a trivector signature database 410. The trivector signature database 410 may be remotely or locally accessible to computer 402 via network 420. In other embodiments, the trivector signature information in trivector signature database 410, or portions therefore, may be cached or otherwise stored locally within computer 402.

Figure 5:
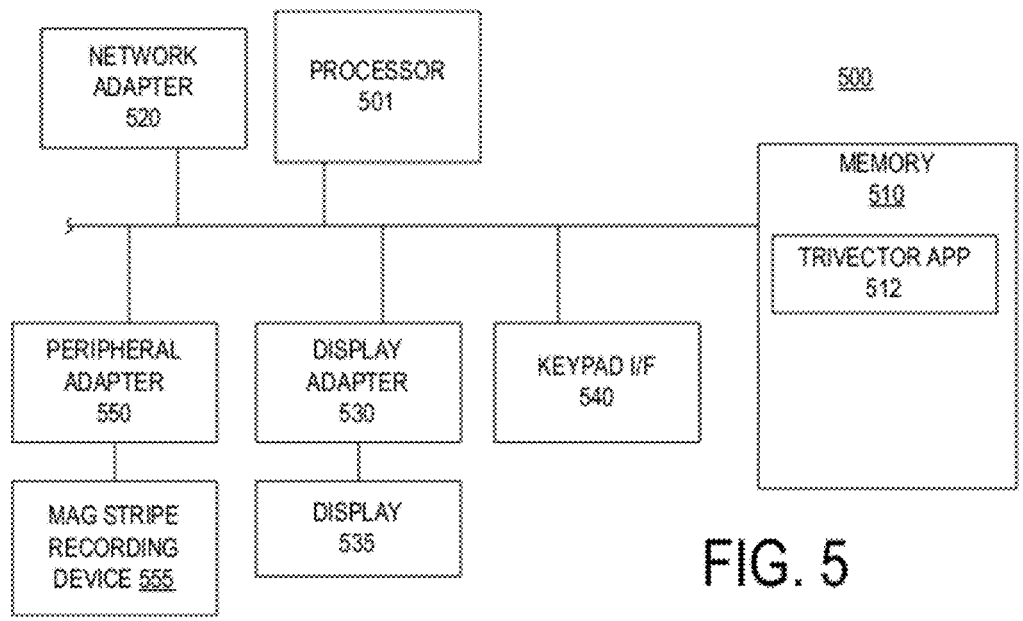
FIG. 5 is a block diagram of an exemplary computing device suitable for use in the system of FIG. 4.

FIG. 5 depicts selected elements of an embodiment of an embodiment of computer 402. In the depicted embodiment, computer 402 includes a processor 501 having access to a memory 510 or other form of machine readable storage medium, a network adapter 520, a display adapter 530, and keypad interface 540, and a peripheral adapter 550. Display adapter 530 is shown coupling a display 535 to processor 501 while peripheral adapter 550 as depicted couples a magnetic strip recording device 555 to processor 501.

The memory 510 as depicted in FIG. 5 includes a trivector application 512 that facilitates the production of a pest management apparatus 100. In some embodiments, a user may invoke trivector application 512 and respond to inputs requesting an identification of the subject species and the pathogen species. The trivector application 512 may then access trivector signature database 410 to retrieve trivector data for the indicated pair of species. From the retrieved trivector data, trivector application 512 may then compute the composite trivector signature and reformat or otherwise further process the composite trivector signature to obtain the composite trivector data that will be stored in the machine readable storage medium of pest management apparatus 100. The trivector application 512 may, in one embodiment, display the composite trivector data values to a user enabling the user to communicate those values to peripheral device 404 for encoding on the machine readable storage medium of pest management apparatus 100.

In embodiments where the machine readable storage medium of pest management apparatus 100 includes three tracks of a magnetic strip, in the same manner as many commercial credit cards, the trivector signature application 512 may include indicate alpha characters for inclusion on track 1. The trivector signature application 512 may further include start and stop sentinels or start and stop characters that are non-compliant with conventional credit card format standards, e.g., ISO/IEC 7183 and related standards so that, the information encoded on pest management apparatus 100 will not be readable from a conventional credit card reader. The conventional start sentinel for track 1 under format "B" of ISO standards is the "%" (percent) character and the start sentinel for track 2 is the ";" (semicolon) character. Thus, some embodiments of trivector application 512 may store a start sentinel other than "%" on track 1 and a start sentinel other than ";" on track 2.

While the claimed subject matter has been shown and described with reference to particular embodiments thereof, it will be understood by those skilled in the art that the foregoing and other changes in form and detail may be made therein without departing from the spirit and scope of the claimed subject matter, including but not limited to additional, less or modified elements and/or additional, less or modified blocks performed in the same or a different order.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method of repelling a second species with respect to a first species comprising:
    determining a first trivector signature for the first species and a second trivector signature for the second species wherein the first trivector signature is derived from a representation of an electromagnetic field characteristic of the first species and the second trivector signature is derived from a representation of an electromagnetic field characteristic of the second species;
    generating a composite trivector signature from the first trivector signature and the second trivector signature; and
    storing trivector data, derived from the composite trivector signature, machine readable storage medium.

2. The method of claim 1, wherein generating said composite trivector signature comprises adding the first trivector signature to an inverse of the second trivector signature.

3. The method of claim 2, wherein said magnetic strips include a plurality of tracks and wherein said storing comprises storing a portion of the trivector data on each of the plurality of tracks.

4. The method of claim 3, wherein said plurality of tracks comprises greater than two tracks.

5. The method of claim 4, wherein said storing of said trivector data comprises storing a first start sentinel on said first track and a second start sentinel on said second track, wherein said first start sentinel represents an ASCII character other than "%" and wherein said second start sentinel represents an ASCII character other than ";".

6. The method of claim 1, wherein determining said first and second trivector signature comprises retrieving predetermined trivectors signatures from a table of trivector signatures.

7. The method of claim 1, wherein determining said first and second trivector signature comprises performing voltammetric measurements on the first and second species and deriving the first and second trivector signatures from the voltammetric measurements.

8. The method of claim 1, further comprising removeably affixing the machine readable storage medium.

* * * * *